Dec. 28, 1943. C. C. COONS 2,337,870
REFRIGERATION
Filed Oct. 23, 1939 2 Sheets-Sheet 2

INVENTOR
Curtis C. Coons
BY
Harry T. Dumarest
ATTORNEY

Patented Dec. 28, 1943

2,337,870

UNITED STATES PATENT OFFICE 2,337,870

REFRIGERATION

Curtis C. Coons, North Canton, Ohio, assignor to The Hoover Company, North Canton, Ohio Application October 23, 1939, Serial No. 300,696

16 Claims. (Cl. 62—5)

This application relates to the art of refrigeration and more especially to an improvement in absorption refrigerating apparatus particularly of the three-fluid type.

In prior domestic absorption refrigerating systems the generator is heated by a gaseous fuel burner of the Bunsen type which is positioned to discharge its flame into a flue passing centrally through the boiler. There are a number of disadvantages to this type of construction among which are the following: The central draft tube construction greatly increases the cost and complexity of the generator and it also tends to cause stratification of lean solution in the lower portion thereof. Domestic refrigerating systems require relatively small quantities of heat and hence the burners operate with small flame. However, the small burner construction thereby necessitated gives considerable trouble due to dust clogging in the secondary air passages and the heat application to the boiler is very uneven because of the fact that the actual flame is concentrated adjacent one end of the boiler and slightly outwardly thereof, thus producing also an appreciable loss of radiant heat. Still another difficulty caused by prior constructions results from the fact that it is practically not feasible to position the liquid heat exchanger in embracing relation to the boiler, thereby necessitating the use of a very large quantity of space to accommodate the generator liquid heat exchanger construction and requiring also the use of very large quantities of insulating material to insulate these two elements from heat losses. Still another disadvantage of prior constructions lies in the fact that they require frequent adjustment and very easily lose their delicate gas discharge orifice and secondary air inlet adjustments. The culmination of these various factors has produced a serious condition from the standpoint of efficiency, ease of manufacture, cost of manufacture, proper heating of the generator and also it has raised a serious problem with respect to the space utilization within their rigidly fixed confines of domestic refrigerator cabinets.

Accordingly it is a principal object of the present invention to provide a construction which will not only eliminate the above mentioned disadvantages but which possesses a number of additional advantages peculiar unto itself.

In accordance with the present invention it is proposed to provide a generator liquid heat exchanger heater assembly for domestic refrigerating systems in which heat is applied uniformly to all portions of the generator by means of a burner not utilizing a mixed source of secondary air and in which the heat is applied in such fashion that stratification of the solution in the generator is substantially eliminated while allowing for an extremely compact assembly of the generator liquid heat exchanger and their associated insulating bodies.

It is a still further object of the present invention to provide a construction in which highly efficient heat transfer is provided between an elongated raw gas burner and the generator of an absorption refrigerating system.

It is another object of the present invention to provide a boiler, analyzer, heater and liquid heat exchanger assembly which is very compact and which may be encased with a minimum amount of insulating material.

It is a further object of the present invention to provide an absorption refrigerating apparatus of the three-fluid type in which heat is applied to the strong solution discharged from the absorber in a plurality of steps to liberate refrigerant vapor therefrom.

Other objects and advantages of the present invention will become apparent as the description proceeds when taken in connection with the accompanying drawings in which.

Figure 1:
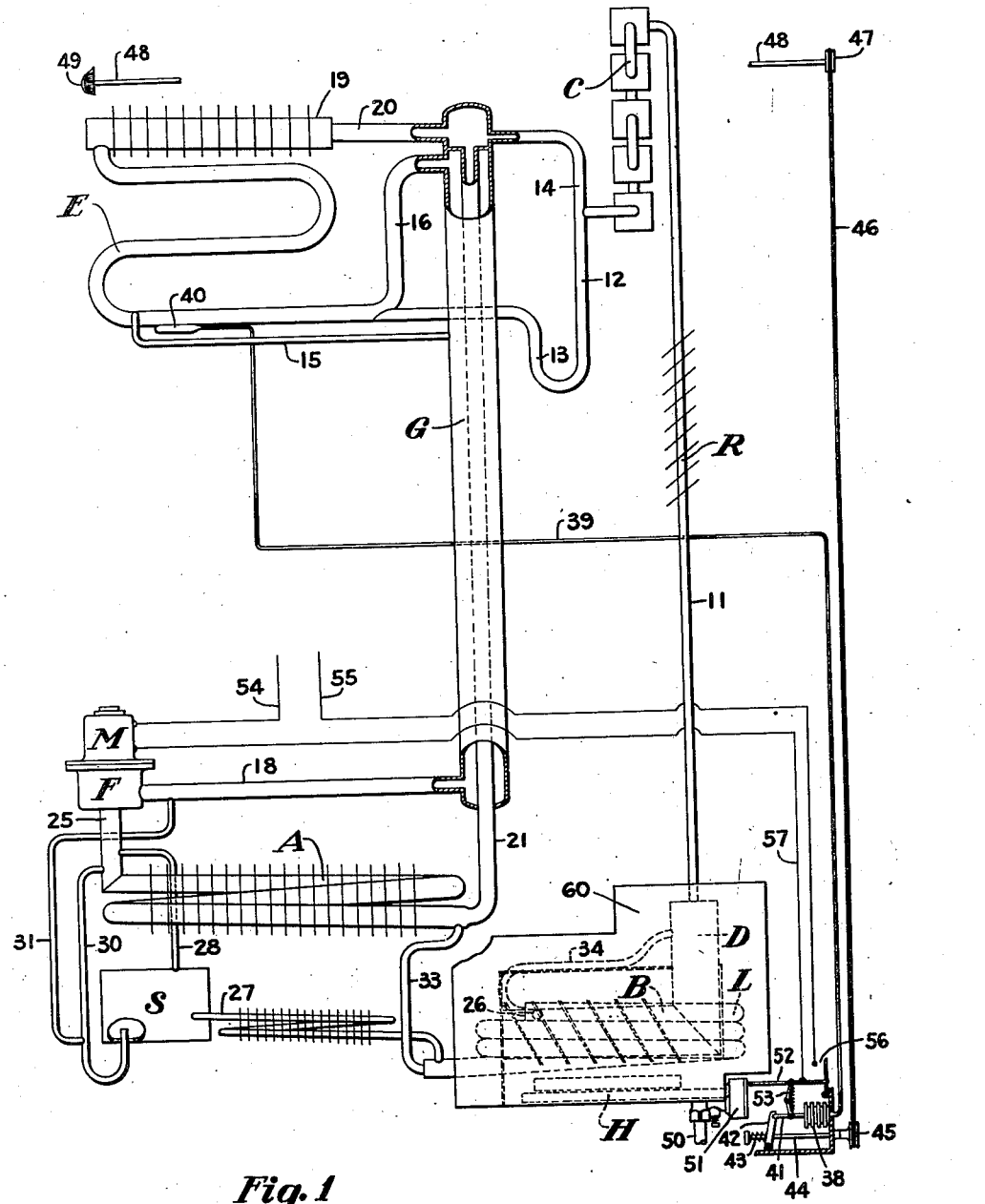
Figure 1 is a diagrammatic representation of an absorption refrigerating system embodying the present invention.

Referring now to the drawings in detail and first to Figure 1 thereof, there is disclosed a three-fluid absorption refrigerating system of the type embodying a boiler B, an analyzer D, an air-cooled rectifier R, a tubular air-cooled condenser C, an evaporator E, a gas heat exchanger G, a tubular air-cooled absorber A, a liquid heat exchanger L, a solution reservoir S, and a circulating fan F which is driven by an electrical motor M. The above mentioned elements are connected by various conduits to form a plurality of gas and liquid circuits constituting a complete refrigerating system which will be described in detail hereinafter.

The above described system will be charged with a suitable refrigerant, such as ammonia, a suitable absorbent therefor, such as water, and an inert pressure equalizing medium preferably a dense inert gas like nitrogen.

The application of heat to the boiler B generates refrigerant vapor from the strong solution normally therein contained. The vapor so generated passes upwardly through the analyzer D in counterflow relationship to strong solution flowing downwardly therethrough. After passing through the analyzer D the resulting refrigerant vapor is conveyed therefrom to the upper portion of the condenser C by way of the conduit 11 which includes the rectifier R.

The refrigerant vapor is converted to the liquid state in the condenser C and is drained from the bottom portion thereof into the bottom portion of the evaporator E by means of a conduit 12 which includes a downwardly extending U-shaped loop portion 13 and an upstanding vent portion 14 which connects to the rich gas side of the gas heat exchanger G.

A propelled stream of lean inert gas is supplied to the evaporator gas inlet conduit 16 which opens into the bottom portion of the evaporator E from the circulating fan F by means of the fan discharge conduit 18 and the outer path of the gas heat exchanger G.

The evaporator E may be of any desired type. However, as diagrammatically illustrated herein, it is of the type in which a high velocity stream of inert gas circulates upwardly through the evaporator E with sufficient force to propel the liquid refrigerant supplied to the bottom portion of the evaporator upwardly therethrough as it is evaporating into the gas stream to produce refrigeration. The evaporator may, for example, be constructed in the manner disclosed in the application of Curtis C. Coons and William H. Kitto, Serial No. 386,395, filed April 2, 1941, now Patent No. 2,328,196, dated August 31, 1943.

The bottom portion of the evaporator is provided with an anti-blocking drain conduit 15 which is connected between the top portion of the lowest evaporator conduit and the outer or lean gas side of the gas heat exchanger G.

After rising through the evaporator E the partially enriched inert gas and remaining liquid refrigerant discharges into a large diameter box-cooling element 19 which is tilted slightly to the rear to allow gravity flow of the liquid therethrough. After traversing the conduit 19 the rich inert gas is conveyed therefrom to the bottom portion of the tubular air-cooled absorber A by way of the conduit 20, the inner or rich gas path of the gas heat exchanger G, and a conduit 21.

The rich gas then flows upwardly through the absorber A in counterflow relationship to lean solution which is supplied to the upper portion thereof in a manner to be described hereinafter. The refrigerant vapor content of the inert gas refrigerant vapor mixture is absorbed in the absorber A and the resulting heat of absorption is rejected to cooling air flowing over the exterior walls of the absorber and the air-cooling fins mounted thereon. After traversing the absorber the resulting lean gas is conveyed to the suction side of the circulating fan F by way of the conduit 25.

The lean solution formed in the boiler B by the generation of refrigerant vapor therefrom is conveyed from the boiler to the solution reservoir S by way of the conduit 26, the liquid heat exchanger L, and a looped finned conduit 27 which also serves as a solution precooler. A vent conduit 28 is connected between the upper portion of the solution reservoir S and a suction conduit 25 of the circulating fan F whereby the solution in the reservoir is subjected to the suction pressure of the fan.

The lean solution is conveyed from the bottom portion of the solution reservoir S into the suction conduit 25 of the circulating fan which opens into the upper portion of the absorber A by means of the gas lift pump conduit 30. Pumping gas is supplied to the conduit 30 at a point below the liquid level normally prevailing therein and in the solution reservoir S by means of a gas supply conduit 31 which is connected to the inert gas discharge conduit 18 of the circulating fan F whereby the lean solution is elevated into the absorber by gas lift action.

The lean solution flows downwardly through the absorber A in counterflow relationship with the rich gas supplied thereto in the manner heretofore described. After traversing the absorber A the resulting rich solution is conveyed therefrom to the upper portion of the analyzer D by means of conduit 33, the liquid heat exchanger L and the conduit 34, thus completing the solution circuit.

The apparatus is provided with a control mechanism which is actuated by means of an expansible pressure sensitive bellows element 38 which is connected to respond to evaporator temperatures by means of a capillary tube 39 and a bulb element 40 which is positioned at any suitable point adjacent the evaporator E. The bellows element is provided with an actuating rod 41 which abuts a pivoted resistor bar 42 against which bears an adjustable resisting spring 43. The spring 43 is adjusted in a known manner by means of an adjusting rod 44 which carries a pulley 45 on its outer end. The pulley 45 is actuated by means of a cable 46 which engages a pulley 47 on the end of an adjusting rod 48 which in turn is manually actuated by means of an adjusting knob 49 which will be positioned at a suitable point adjacent the evaporator.

Gas is supplied by way of a conduit 50, a valve mechanism 51, to a burner H which is positioned beneath the boiler in a manner to be described more in detail hereinafter. The valve mechanism 51 is actuated by means of a rod 52 from the bellows element 38 through the intermediary of a snap acting toggle mechanism 53.

Electrical energy is supplied for operating the circulating motor M by means of the supply wires 54 and 55. The wire 54 connects directly to the circulating motor M and the wire 55 connects to one terminal of a switching mechanism 56 which is also connected to be operated by the rod 52 simultaneously with operation of the gas valve 51. The switch 56 is also connected directly to the circulating motor M by means of a wire 57, thereby completing the operative circuit of the motor M.

The arrangement is such that the attainment of a predetermined temperature in the evaporator will expand the bellows 38 sufficiently against the resistance of the spring 43 to move the valve 51 to open position and to close the circuit for the switch 56, thereby energizing the heater H and the motor M. This condition will continue with consequent production of refrigeration until such time as the evaporator temperature will have dropped to a second predetermined value at which time the bellows 38 will contract and will actuate the switch 56 to open circuit position and the valve 51 to closed position through the action of the toggle 53. It will be understood that the actuating temperatures of the bellows 38 may be suitably selected by operation of the control knob 49.

Figure 2:
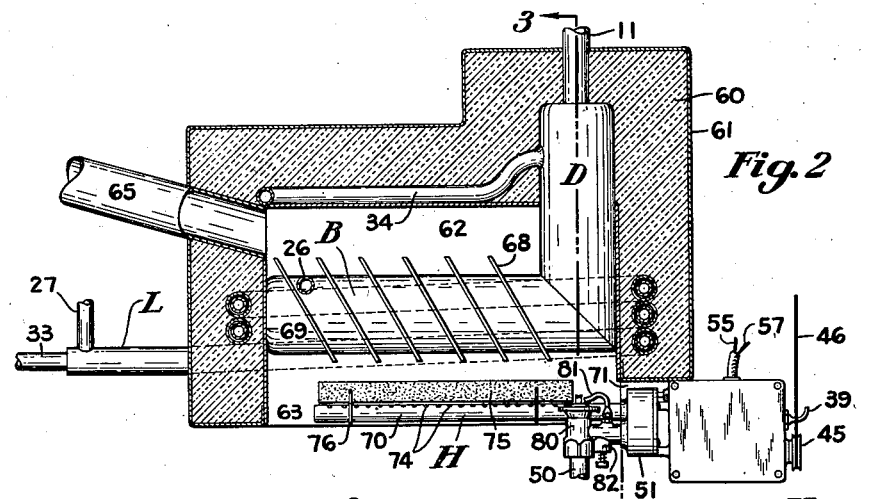
Figure 2 is a sectional elevational view drawn to an enlarged scale of a generator assembly.

Referring now to Figure 2 the general boiler assembly is illustrated in detail. As is clearly apparent from Figure 2 the boiler-analyzer liquid heat exchanger construction is embedded in a body of insulating material 60 which is encased in a suitable sheet metal housing 61. The insulating body 60 is provided with an interior chamber 62 which receives the boiler B and the lower portion of the analyzer D. As is also apparent from Figure 2 the liquid heat exchanger L is embedded within the material 60 and is wrapped about the boiler B. The lower portion of the space 62 is formed into a narrow combustion air inlet passageway 63 which receives the gas burner H for heating the boiler B. A suitable products of combustion offtake flue 65 opens from the upper dome portion of the space 62 and terminates in a suitable point of discharge for such waste products of combustion.

The boiler B is provided with a plurality of fins 68 which are secured to the same in intimate heat transfer relationship and which are slanted in the direction of the offtake flue 65. It will also be noted from Figure 3 that the fins are shaped to conform to the interior configuration of the combustion space 62 and that they terminate above the air inlet opening 63 and the burner H which is positioned therein.

As shown, a small space is left between the lateral side edges of the fin 68 and the liner plate 69 of the combustion space 62.

The burner H comprises an elongated tube 70 which is carried by the valve housing 51 which is seated in a recess 71 formed in the insulating body 60. The tube 70 is provided with spaced rows of combustion ports 74 in its upper surface between and above which is mounted a refractory combustion plate 75. The combustion plate 75 may be formed of any suitable refractory material and is provided with a very rough surface for the purpose of forming numerous small protuberances which may become incandescent very quickly. The plate 75 is thus a radiant and insures complete combustion of the gas and radiant heating of the boiler. The plate 75 is supported from and above the burner tube 70 by means of a pair of supporting clips 76 which embrace the tube 70 and are provided with upstanding portions 77 between which the refractory rests. The refractory is spaced slightly above the upper surface of the tube 70 by means of inward projections 78 on the supporting clips 76.

Figure 3:
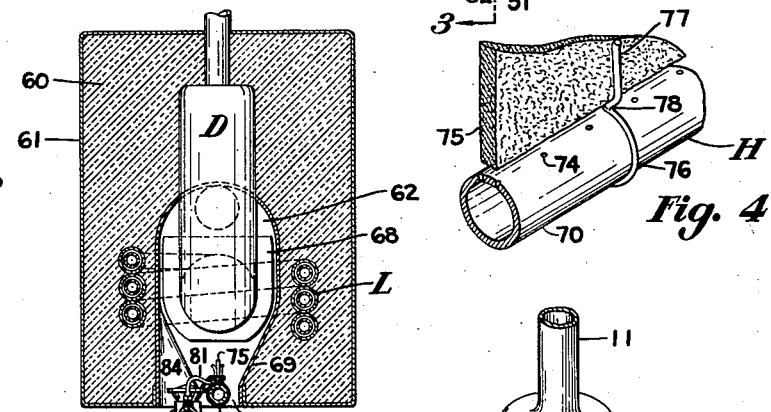
Figure 3 is a view taken along the lines 3—3 of Figure 2 and looking in the direction of the arrows.
Figure 4:
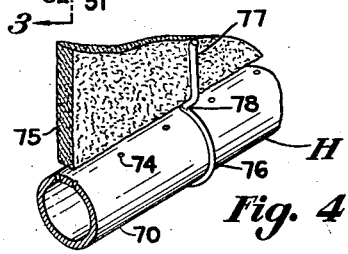
Figure 4 is a partial perspective sectional view of a detail.
Figure 5:
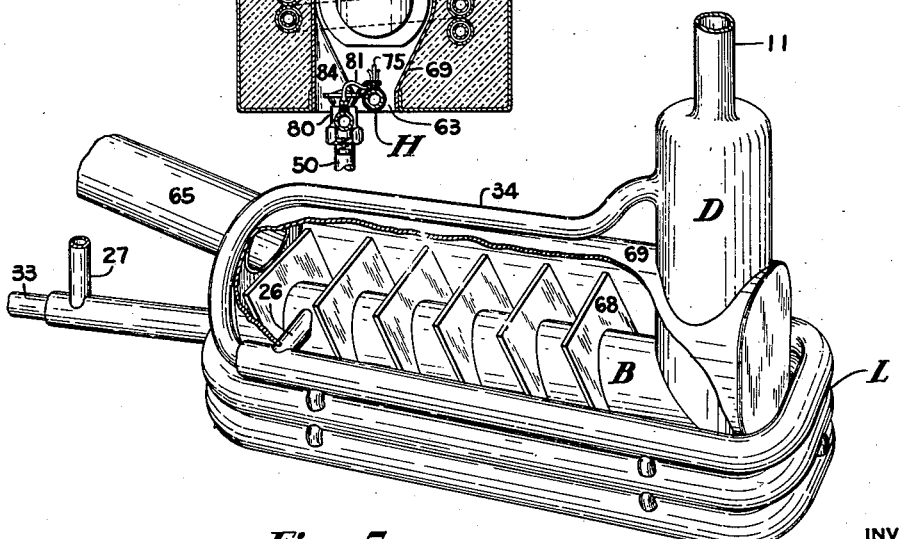
Figure 5 is a perspective view on an enlarged scale of a boiler-analyzer liquid heat exchanger assembly.

A safety cut-off valve 80 is provided in the conduit 50 just ahead of its connection to the valve 51. A small pilot burner 81 is connected between the valves 80 and 51. A small push button operated by-pass indicated generally at 82 is provided for igniting the pilot flame 81. The arrangement is such that the pilot flame 81 will be in close proximity to the ports 74 and the burner 70 for the purpose of igniting the same and will also heat the thermostatic element of the thermostatic safety cut-off valve 80 to maintain the same in open position so long as a flame is carried by the pilot burner 81. Failure of flame at the burner 81 immediately causes the pilot safety valve 80 to close to discontinue the supply of fuel to the burners 70 and 81. As is illustrated in Figure 3, the pilot burner 81 and the safety cut-off valve 80 extend into a recess 84 which is formed in the side of the throat 63.

In the operation of the apparatus small jets of raw gas issue from the ports 74 and burn completely on the incandescent surfaces of the refractory plate 75. It has been found that this type of burner gives the most perfect combustion obtainable.

It will be noted that the refractory plate 75 is positioned directly beneath the boiler B and substantially along the longitudinal center thereof whereby the flame issuing from the ports 74 on opposite sides thereof tend to flow along opposite sides of the boiler B and over the fins 68 which are mounted thereon.

This boiler burner arrangement provides a very large heating area on the boiler even aside from the fins 68 and since the hottest flame tends to strike the very bottom portion of the boiler a lively circulation of liquid is set up therein which substantially prevents the formation of a stagnant body of weak solution along the bottom wall of the boiler; that is, the entire boiler is functional. Due to the fact that the strong solution conduit 34 lies directly on top of the liner 69 of the combustion space 62 and in heat exchange relationship therewith, the products of combustion which have passed over the boiler give out further heat to this element, thereby further improving the economy of the system as a whole and also insuring that the liquid supplied to the analyzer D will be in a very hot condition which materially facilitates liberation of refrigerant vapor in the analyzer and weakening of the solution flowing therethrough.

It is also of importance in this connection to note that the heat is applied substantially uniformly to all portions of the boiler proper wherefore all portions thereof are enabled to operate at maximum efficiency with consequent improvement in the economy of the system as a whole. Moreover, the lower portion of the analyzer is exposed to the combustion space and is accordingly heated by the surrounding hot gases.

The burner arrangement herein disclosed has been found to be well adapted to burn the small quantities of gas normally supplied to domestic absorption refrigerating systems with high efficiency, with complete combustion and with no difficulty due to dust clogging of various passageways such as give considerable trouble in present units which utilize Bunsen type burners to heat the boiler.

It has been found that the refractory plate insures one hundred percent combustion of the fuel discharged through the ports 74, that it permits the combustion to occur at a very high temperature closely adjacent the bottom portion of the boiler B without interfering with draft conditions and without the production of odors or toxic gases. The refractory also acts as an efficient gas guiding element to insure that each side of the boiler will receive substantially the same quantity of heat per unit of time and the surface combustion which occurs on the refractory 75 provides an intense blue flame under all conditions of operation.

It will be understood that the throat 63 will be designed for any particular installation to provide the requisite amount of combustion air for the particular burner utilized therein. Due to the positioning of the burner and pilot they are effectively shielded from stray drafts by the insulated housing 60.

In previous constructions it has been necessary to extend the central boiler combustion tube outwardly beyond the boiler insulation in order to receive the products of combustion from the burner which construction necessitated a considerable increase in the overall boiler burner assembly length. Moreover, the liquid heat exchanger had to be positioned laterally of the boiler burner assembly which consumed a great deal of precious space. With the present arrangement the burner is positioned directly beneath the boiler, the insulation has its smallest possible size in order to accommodate the boiler assembly, and the liquid heat exchanger being wrapped around the boiler is in the most compact arrangement possible.

While the invention is disclosed herein in considerable detail, various changes may be made in the arrangement, construction and proportion of the parts without departing from the spirit of the invention or the scope of the appended claims.

I claim:

1. Absorption refrigerating apparatus comprising an inert gas circuit including an evaporator and an absorber, a solution circuit including a boiler and said absorber, means for liquefying refrigerant vapor produced in said generator and for supplying the refrigerant liquid to said evaporator, said boiler comprising a substantially horizontal tubular body, a housing of insulating material about said boiler including a hollow combustion space receiving said boiler, an elongated raw gas burner positioned below said boiler, an upstanding radiant positioned centrally of said boiler and between said boiler and said burner, a products of combustion discharge flue opening through said housing into said combustion space, and heat transfer fins on said boiler inclined upwardly from the bottom thereof toward said flue.

2. Absorption refrigerating apparatus comprising an inert gas circuit including an evaporator and an absorber, a solution circuit including a boiler and said absorber, means for liquefying refrigerant vapor produced in said generator and for supplying the refrigerant liquid to said evaporator, said boiler comprising a substantially horizontal tubular body, a housing of insulating material about said boiler including a hollow combustion space receiving said boiler, an elongated raw gas burner positioned below said boiler, an upstanding radiant positioned centrally of said boiler and between said boiler and said burner, a products of combustion discharge flue opening through said housing into said combustion space, heat transfer fins on said boiler inclined upwardly from the bottom thereof toward said flue, said solution circuit including a liquid heat exchanger coiled about said boiler and embedded in the insulation of said housing.

3. A vapor generating assembly for absorption refrigerating systems comprising an elongated tubular boiler element, an upstanding analyzer element on one end of said boiler element, a liquid heat exchanger coiled about said boiler element and in spaced relation therewith, said liquid heat exchanger having one pass connected to said boiler element and another pass connected to said analyzer element, a combustion space liner about said boiler element and the lower end of said analyzer element, a gas discharge conduit connected to said liner and opening into the combustion space defined thereby, and a plurality of heat conducting fins on said boiler element inclined upwardly in the direction of said gas discharge conduit.

4. Absorption refrigerating apparatus including a vapor generating assembly comprising a boiler, an analyzer, a combustion zone defining partition around and in spaced relationship with said boiler and a portion of said analyzer, a plurality of slanted fins on said boiler within said combustion zone defining element, a products of combustion discharge flue communicating with said combustion zone, an elongated fuel burner positioned beneath said boiler and within said combustion zone defining element, said combustion zone defining element being narrowed adjacent said burner to form a restricted combustion air inlet opening therewith.

5. Absorption refrigerating apparatus including a vapor generating assembly comprising a boiler, an analyzer, a combustion zone defining partition around and in spaced relationship with said boiler and a portion of said analyzer, a plurality of slanted fins on said boiler within said combustion zone defining element, a products of combustion discharge flue communicating with said combustion zone, an elongated raw gas burner positioned beneath said boiler and within said combustion zone defining element, a rough surfaced refractory plate supported upon said burner beneath said boiler, said burner having flame ports on each side of said refractory plate, said combustion zone defining element being narrowed adjacent said burner to form a restricted combustion air inlet opening therewith.

6. Absorption refrigerating apparatus including a vapor generating assembly comprising a boiler, an analyzer, a combustion zone defining partition around and in spaced relationship with said boiler and a portion of said analyzer, a plurality of slanted fins on said boiler within said combustion zone defining element, a products of combustion discharge flue communicating with said combustion zone, a liquid heat exchange device coiled about said boiler outside said combustion zone defining means, a conduit connecting said liquid heat exchange device to said analyzer and in heat exchange relationship with said combustion zone defining means, an elongated raw gas burner positioned beneath said boiler and within said combustion zone defining element, a rough surfaced refractory plate supported upon said burner beneath said boiler, said burner having flame ports on each side of said refractory plate, said combustion zone defining element being narrowed adjacent said burner to form a restricted combustion air inlet opening therewith.

7. Absorption refrigerating apparatus including a vapor generating assembly comprising a boiler, an analyzer, a combustion zone defining partition around and in spaced relationship with said boiler and a portion of said analyzer, a plurality of slanted fins on said boiler within said combustion zone defining element, a products of combustion discharge flue communicating with said combustion zone, a liquid heat exchange device coiled about said boiler outside said combustion zone defining means, a conduit connecting said liquid heat exchange device to said analyzer and in heat exchange relationship with said combustion zone defining means, an elongated raw gas burner positioned beneath said boiler and within said combustion zone defining element, a rough surfaced refractory plate supported upon said burner beneath said boiler, said burner having flame ports on each side of said refractory plate, said combustion zone defining element being narrowed adjacent said burner to form a restricted combustion air inlet opening therewith, and a body of insulating material surrounding said liquid heat exchange device, said analyzer, and said combustion zone defining means except for said combustion air inlet.

8. Absorption refrigerating apparatus comprising a boiler assembly, a combustion zone defining means encompassing said boiler assembly and arranged to form a narrow combustion air supply slot communicating with said combustion zone, an elongated burner adjacent said slot for receiving combustion air therefrom and for heating said boiler assembly, said burner being shielded from drafts by said combustion space defining means, means extending longitudinally atop said burner arranged to protect the same from cross drafts and an ignition burner for said elongated burner also positioned to be shielded from drafts by said combustion space defining means.

9. Absorption refrigerating apparatus comprising a boiler assembly, a combustion zone defining means encompassing said boiler assembly and arranged to form a narrow combustion air supply slot communicating with said combustion zone, an elongated burner adjacent said slot for receiving combustion air therefrom and for heating said boiler assembly, said burner being shielded from drafts by said combustion space defining means, means extending longitudinally atop said burner arranged to protect the same from cross drafts, an ignition burner for said elongated burner also positioned to be shielded from drafts by said combustion space defining means, a flame failure responsive fuel supply interrupter positioned to be heated by said pilot burner, and a recess formed in said slot to accommodate said interrupter.

10. Absorption refrigerating apparatus in which means are provided for liquefying refrigerant vapor, evaporating the liquid, and absorbing the vapor in solution including a generator, an analyzer connected to said generator, means for conveying solution previously enriched by absorption of refrigerant vapor to said analyzer, means for conveying solution weakened by the generation of refrigerant vapor therefrom away from said generator, and means for heating said generator, said means for conveying solution to said analyzer, and a portion of said analyzer spaced from the portion thereof to which the solution is supplied.

11. Vapor producing apparatus for absorption refrigerating apparatus comprising a substantially horizontal generator, an upstanding analyzer attached to one end of said generator, means adapted to convey rich solution to said analyzer, means adapted to convey weak solution from said generator, a plurality of slanted heat conducting fins mounted on said generator, a combustion chamber housing said generator and said analyzer, and a flue for waste products of combustion opening from said chamber at a point remote from said analyzer.

12. Vapor producing apparatus for absorption refrigerating apparatus comprising a substantially horizontal generator, an upstanding analyzer attached to one end of said generator, means adapted to convey rich solution to said analyzer, means adapted to convey weak solution from said generator, a plurality of slanted heat conducting fins mounted on said generator, an elongated raw gas burner having a plurality of laterally spaced longitudinally extending flame ports mounted centrally beneath said generator, and an upstanding radiant positioned longitudinally of said burner and between said laterally spaced flame ports.

13. A generator heater for absorption refrigerating apparatus comprising an elongated tubular raw gas burner having a plurality of laterally spaced longitudinally extending flame ports, a radiant positioned longitudinally of said burner and between said laterally spaced flame ports, means for supporting said radiant on said burner, and fuel supply means for said burner.

14. A vapor generator for absorption refrigerating apparatus comprising an elongated tubular boiler element, a vertically extending analyzer connected to said boiler means for supplying solution to the upper portion of said analyzer, means for conveying weakened solution away from said boiler, means forming a heating chamber encompassing said boiler and the lower portion of said analyzer, a waste products of combustion flue communicating with a part of said heating chamber remote from said analyzer, and a plurality of heat transfer fins mounted on said boiler, said fins being arranged to direct heating gases around said boiler in the general direction of said flue.

15. That improvement in the art of absorption refrigeration which includes the steps of applying heat to a solution of refrigerant in an absorbent in a heating place to expel refrigerant vapor from the solution, removing solution from which refrigerant has been expelled from the heating place, flowing solution rich in refrigerant in a path of flow toward said place of heating, contacting the solution in said path of flow with refrigerant vapor expelled from solution in said place of heating, and applying heat to said solution and refrigerant vapor in a portion only of that part of said path of flow in which solution and refrigerant vapor are in contact.

16. That improvement in the art of absorption refrigeration which includes the steps of applying heat to a solution of refrigerant in an absorbent in a heating place to expel refrigerant vapor from the solution, removing solution from which refrigerant has been expelled from the heating place, flowing solution rich in refrigerant in a path of flow toward said place of heating, contacting the solution in said path of flow with refrigerant vapor expelled from solution in said place of heating, applying heat to said solution and refrigerant vapor in a portion only of that part of said path of flow in which solution and refrigerant vapor are in contact, and applying heat to the solution in a portion of said path of flow in which the solution is not in contact with refrigerant vapor.

CURTIS C. COONS.